United States Patent
Zatloukal

(10) Patent No.: US 7,823,139 B2
(45) Date of Patent: Oct. 26, 2010

(54) METHOD AND SYSTEM FOR TRANSLATING PROGRAMMING LANGUAGES

(75) Inventor: Kevin Zatloukal, Cambridge, MA (US)

(73) Assignee: BEA Systems, Inc., San Jose, CA (US)

(*) Notice: Subject to any disclaimer, the term of this patent is extended or adjusted under 35 U.S.C. 154(b) by 1218 days.

(21) Appl. No.: 10/891,693

(22) Filed: Jul. 15, 2004

(65) Prior Publication Data

US 2005/0015759 A1  Jan. 20, 2005

Related U.S. Application Data

(60) Provisional application No. 60/488,648, filed on Jul. 19, 2003.

(51) Int. Cl.
*G06F 9/45* (2006.01)

(52) U.S. Cl. ........................ 717/140; 717/143
(58) Field of Classification Search .......... 717/140, 717/141–149
See application file for complete search history.

(56) References Cited

U.S. PATENT DOCUMENTS

| | | | | |
|---|---|---|---|---|
| 5,339,419 A | * | 8/1994 | Chan et al. | 717/147 |
| 6,625,804 B1 | * | 9/2003 | Ringseth et al. | 717/114 |
| 6,738,967 B1 | * | 5/2004 | Radigan | 717/146 |
| 6,795,921 B2 | * | 9/2004 | Hayashi et al. | 726/33 |
| 6,820,253 B1 | * | 11/2004 | Robison | 717/141 |
| 6,986,104 B2 | * | 1/2006 | Green et al. | 715/234 |
| 7,100,153 B1 | * | 8/2006 | Ringseth et al. | 717/140 |
| 7,120,898 B2 | * | 10/2006 | Grover et al. | 717/114 |
| 7,293,261 B1 | * | 11/2007 | Anderson et al. | 717/136 |
| 2005/0273315 A1 | * | 12/2005 | Laitila | 704/9 |
| 2005/0289522 A1 | * | 12/2005 | Chang et al. | 717/140 |
| 2007/0028222 A1 | * | 2/2007 | Meijer et al. | 717/140 |

* cited by examiner

*Primary Examiner*—Lewis A Bullock, Jr.
*Assistant Examiner*—Greg Pollock
(74) *Attorney, Agent, or Firm*—Squire, Sanders & Dempsey, LLP

(57) ABSTRACT

A system that provides programming language translation includes a first compiler that compiles a source file in a first programming language into a parsed representation of the first programming language, and a transformation component that receives the parsed representation and generates a token stream from the parsed representation. The token stream comprises second language tokens of a second programming language and at least one compilation phase of the first compiler is skipped. The system further includes a second compiler that compiles the token stream into an object code and skips at least one compilation phase of the second compiler. The transformation component provides the token stream to the second compiler in memory.

22 Claims, 4 Drawing Sheets

METHOD AND SYSTEM FOR TRANSLATING PROGRAMMING LANGUAGES

CLAIM OF PRIORITY

This application claims priority from the following application, which is hereby incorporated by reference in its entirety:

U.S. Provisional Patent Application No. 60/488,648, entitled METHOD AND SYSTEM FOR TRANSLATING PROGRAMMING LANGUAGES, by Kevin Zatloukal, filed Jul. 19, 2003.

FIELD OF THE DISCLOSURE

The present invention disclosure relates to the field of compiler design and compiler optimization.

BACKGROUND

In general, a compiler can translate one computer programming language suitable for processing by humans (the source language) into another computer programming language suitable for processing by machines (the target language). Some computer programming languages may be translated in two phases, by compiling the source code in a first language into the code in a second language, then compiling the source code of the second language to the code in the desired target language. By way of a non-limiting example, Java® Server Page (JSP) files are generally compiled into Java® source files, which are then compiled by a standard Java® compiler into Java® byte codes (i.e., the target language). Usually, such language translation is accomplished with two compilers, which are invoked separately, each reading their input source file from and writing their object code as an output file back to a non-volatile storage, which can be but is not limited to, a hardware disk (referred to as disk). However, translating language source files in two different phases using two different compilers can be inefficient, especially when the output file of the first compiler is output to the disk and has to be input again from the disk by the second compiler.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
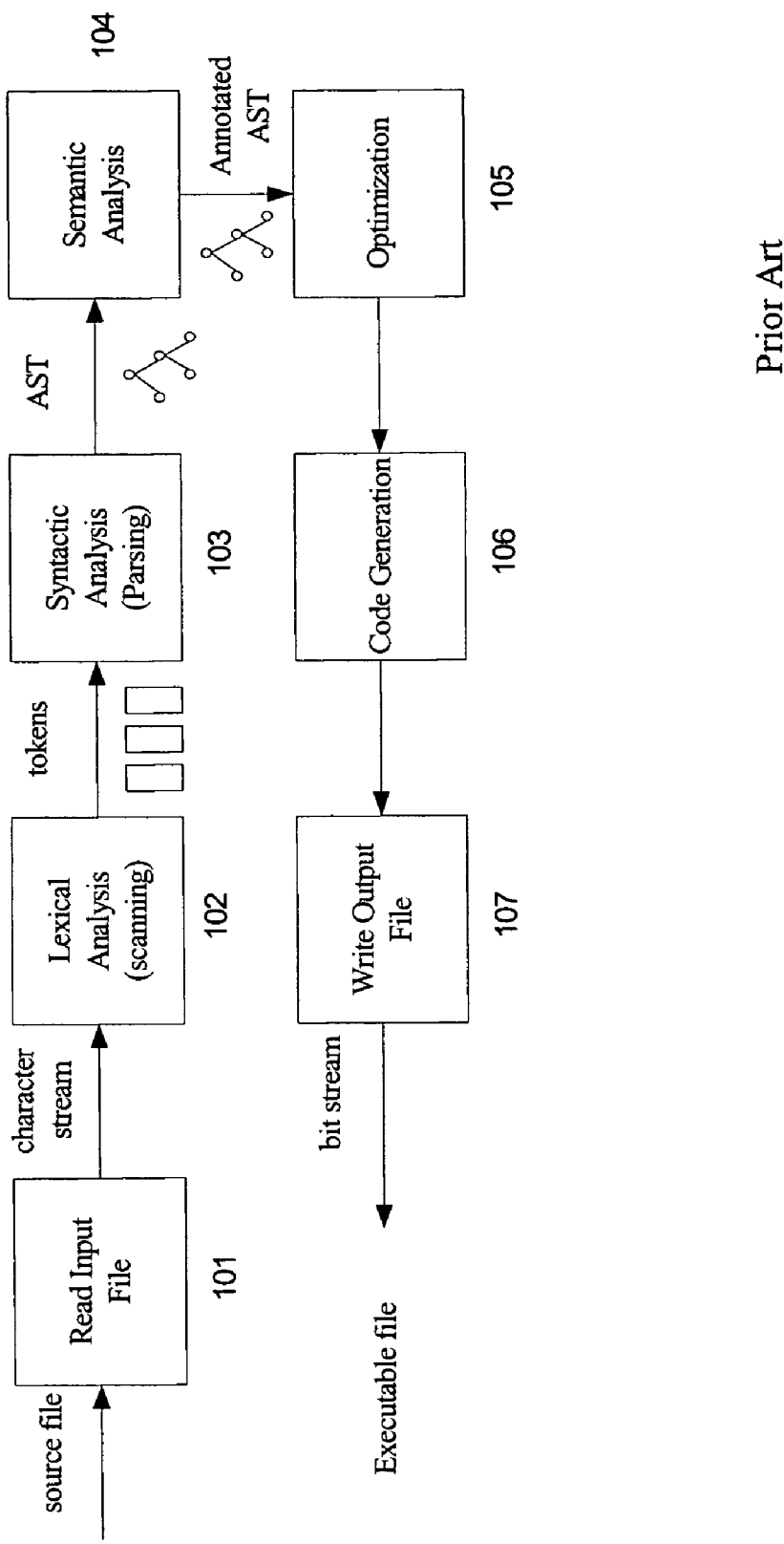
FIG. 1 is an illustration of an exemplary prior art compilation process involving a single compiler.

FIG. 1 is an illustration of an exemplary prior art compilation process involving a single compiler. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 1, a single compiler takes a source file as input and produces an object code file as output. The exemplary compilation process can include the following phases:

The input source file is read by the compiler at step 101.

Lexical analysis (scanning) at step 102 translates a stream of characters (the source code) into a stream of tokens. By way of a non-limiting example, tokens in the C programming language might include +, −, −>, int, and foo( ). In this example, the first three tokens are operators (two arithmetic and a pointer de-reference), the fourth is a keyword, and the last is an identifier (used to name a function or variable).

Syntactic analysis (parsing) at step 103 determines if the source code (represented by tokens) conforms to the syntax rules of the programming language. By way of a non-limiting example, a syntax rule for a particular language might require that a multiplication operator has a left operand and a right operand. A language grammar may be used to explicitly define the syntax of a programming language. In addition, syntactic analysis can produce a parsed representation of the source file to facilitate further analysis and code generation (e.g., an abstract syntax tree). The parsed representation may contain information about the operators, operands and data types of language expressions and statements in the source files.

Semantic analysis at step 104 examines the parsed representation of the source file, judges whether or not the source code adheres to the semantic rules of the programming language and may augment the parsed representation of the source file with additional information e.g. for subsequent compile phases. A semantic rule, by way of a non-limiting example, might mandate that an integer and an array cannot be multiplied together with the * operator.

Code optimization at step 105 can improve the efficiency of the code by applying specific optimizations to the parsed representation of the source file. By way of a non-limiting example, the optimizer may use techniques such as common sub-expression elimination to identify and eliminate redundant steps expressed in the source code.

Object code generation at step 106 generates the target language for a specific computing platform (e.g., machine code for a specific hardware architecture or byte codes for a specific virtual machine).

An object code file can then be generated (e.g. a class or .exe file) at step 107.

Figure 2:
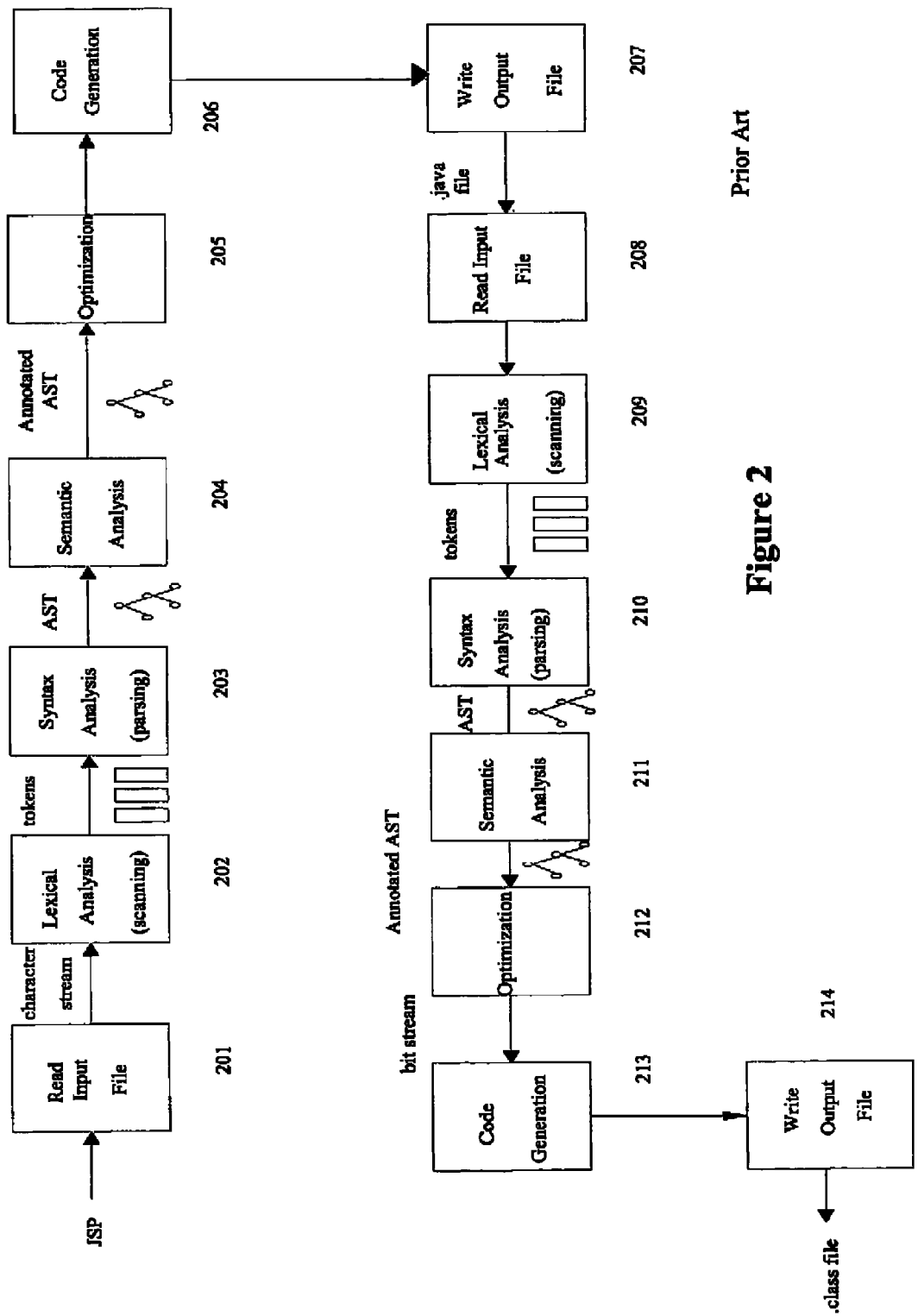
FIG. 2 is an illustration of an exemplary prior art JSP translation process using two compilers.

FIG. 2 is an illustration of an exemplary prior art JSP translation process using two compilers instead of one. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, the JSP translation process can be divided into two compiling phases executed by two different compilers. In the first phase, a JSP compiler reads the JSP source file at step 201, performs lexical analysis at step 202, syntactic analysis at step 203, semantic analysis at step 204, optimization at step 205 and code generation at step 206 before writing the resulting Java® source file from memory to storage at step 207. In the second phase, a Java® compiler reads the Java® source file from disk back into memory at step 208 and again performs lexical analysis at step 209, syntactic analysis at step 210, semantic analysis at step 211, optimization at step 212 and code generation at step 213 before writing the final Java® class file to disk at step 214.

As is evident from the descriptions above, the process of compiling language source files using two different compilers (e.g., JSP and Java®) includes inherent inefficiencies. Most notably, since the first compiler (i.e., the JSP compiler) has a fully parsed representation of the Java® source file, it is inefficient to write the Java® source file to disk just so that the second compiler (i.e., the Java® compiler) has to read it from disk again and reproduce a parsed representation. In addition, it is inefficient to load and execute two separate compilation processes.

Embodiments of the present invention enable the language translation process involving more than one compilers to be completed entirely in memory, making it faster and more efficient. Two approaches can be adopted: in one embodiment, a transformation component is employed, which is capable of generating a token stream from the parsed representation of a source file produced by the first compiler and providing it to the parser of the second compiler, skipping the "Optimization", "Code Generation", and "Write Output File" phases of the first compiler and the "Read Input File" and "Lexical Analysis" phases of the second compiler; in another embodiment, the bit stream produced by the code generator of the first compiler is passed directly to the lexical analyzer of the second compiler instead of writing the bit stream to disk, then reading it back from the disk, eliminating the "Write Output File" phase of the first compiler and the "Read Input File" phase of the second compiler. It will be apparent to those skill in the art that both approaches are not limited to any particular source language or target language.

Figure 3:
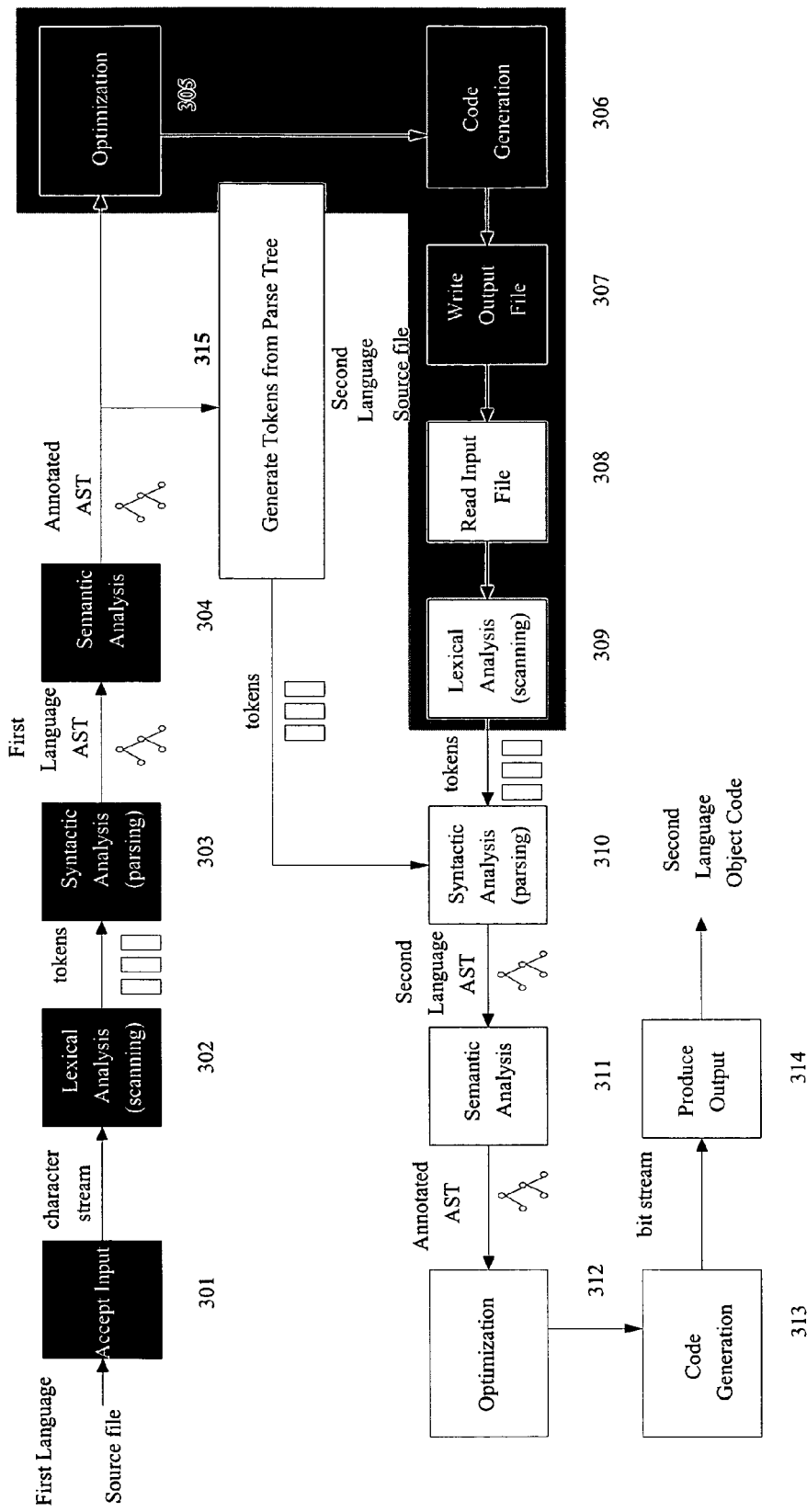
FIG. 3 is an illustration of an exemplary in memory language translation process in accordance with one embodiment of the present invention.

FIG. 3 is an illustration of an exemplary in memory language translation process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, the black boxes represent processes traditionally carried out by a first compiler and the white boxes represent processes traditionally carried out by a second compiler. The compilation stages potentially eliminated by the exemplary process are highlighted in gray. The compilers and their components can communicate in a number of ways, including but not limited to: memory, database(s), file(s), network communication, and/or other suitable means.

Referring again to FIG. 3, after reading the source file at step 301, the first compiler performs one or more of lexical analysis at step 302, syntax analysis at step 303, semantic analysis at step 304 before generating a parsed representation (e.g., a parse tree) of the source file. Then, the parsed representation can be converted into a stream of tokens suitable for providing to the second compiler by a transformation component capable of generating tokens from parse tree at step 315. The parser of the second compiler may accept the token stream at step 310, perform one or more of syntactic analysis at step 311, semantic analysis at step 312, optimization at step 313 and then generate code at step 314.

In some embodiments, the "Optimization" (step 305), "Code Generation" (step 306), and "Write Output File" (step 307) phases of a first compiler and the "Read Input File" (step 308) and "Lexical Analysis" (step 309) phases of a second compiler may be omitted if the parsed representation of the first language produced by the first compiler is converted into a token stream and provided to the parser of the second compiler.

In some embodiments, the generation of tokens from a parse tree by the transformation component can be performed in memory. Such in-memory operation may avoid the inefficiency in computing resource utilization caused by writing the output file to a disk by the first compiler and reading the same file again from the disk by the second compiler.

In some embodiments, the transformation component may perform a traversal of the parse tree, in which zero or more tokens suitable for processing by the second compiler are emitted for each node in the parse tree generated by the first compiler. Such traversal may be implemented as an in-order tree traversal, a technique well known in the art.

In some embodiments, the parse tree generated by the first compiler may be adjusted before it is traversed in order to change the order in which nodes in the tree are processed. Such adjustment may be performed in order to account for, as non-limiting examples, differences in the ordering, precedence, semantics of operations and other suitable situations in the first and second languages.

In some embodiments, the creation of the transformation component may be facilitated by starting with the existing code generator of the first compiler and modifying it to generate tokens suitable for processing by the parser of the second compiler. Such an approach avoids the generation of a character stream suitable for processing by the lexical analyzer of the second compiler.

In some embodiments, the creation of the transformation component may be facilitated by starting with the existing lexical analyzer of the second compiler and modifying it to read its input directly from the parse tree of the first compiler instead of reading its input from a character stream, e.g. from disk.

Figure 4:
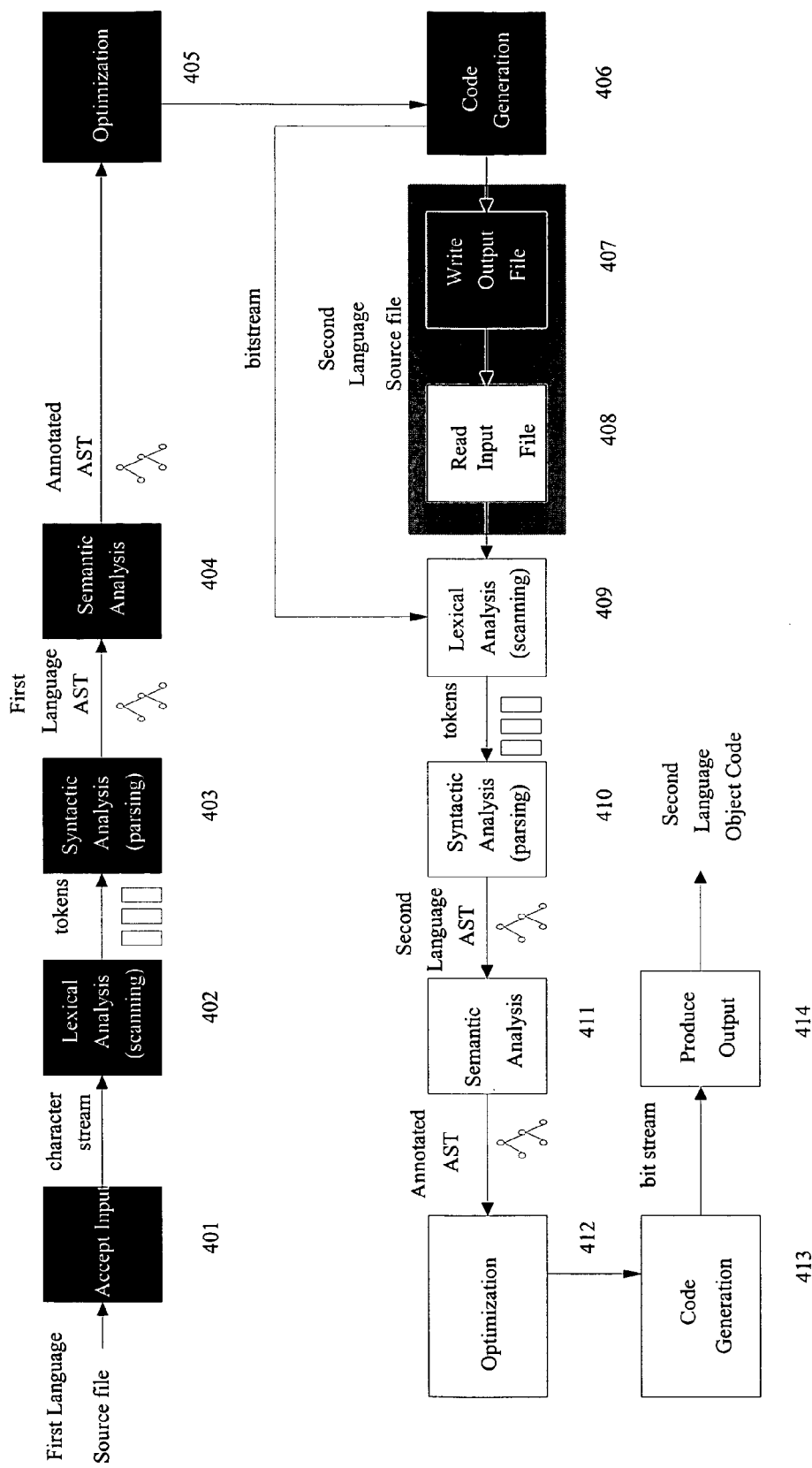
FIG. 4 is an illustration of an exemplary in memory language translation process in accordance with another embodiment of the present invention.

FIG. 4 is an illustration of an exemplary in memory language translation process in accordance with another embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 4, the black boxes represent processes traditionally carried out by a first compiler and the white boxes represent processes traditionally carried out by a second compiler similar to FIG. 3. The compilation stages potentially eliminated by the exemplary process are highlighted in gray. The compilers and their components can communicate in a number of ways, including but not limited to: memory, database(s), file(s), network communication, and/or other suitable means.

Referring again to FIG. 4, steps 401-414 perform similar operations as steps 301-314 with the exception that the bit stream produced by the code generator of the first compiler at step 406 is passed directly to the lexical analyzer of the second compiler at step 409 instead of writing the bit stream to disk, then reading it back from the disk. Such adjustment may eliminate the "Write Output File" (step 407) phase of the first compiler and the "Read Input File" (step 408) phase of the second compiler and enable the entire language compilation process to be performed entirely in memory, making it faster and more efficient.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "translation" or "translating" is used in the embodiments of the systems and methods described above, it will be evident that such concept can be interchangeably used with equivalent concepts such as, compilation or compiling, and other suitable concepts; while the concept "in memory" is used in the embodiments of the systems and methods described above, it will be evident that such concept can be interchangeably used with equivalent concepts such as, without accessing a disk, and other suitable concepts; while the concept "object code or file" is used in the embodiments of the systems and methods described above, it will be evident that such concept can be interchangeably used with equivalent concepts such as, executable code or file, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system that includes a processor that executes instructions that provides programming language translation, comprising:

a first compiler comprises a first lexical analysis, a first syntactic analysis, a first semantic analysis, a first optimization, and a first code generation;

a second compiler comprises a second lexical analysis, a second syntactic analysis, a second semantic analysis, a second optimization, and a second code generation; and a transformation component;

where the first compiler compiles a source file in a first programming language into a parsed representation of the first programming language, the first compiler transforming the source file into first language tokens, and parsing the first language tokens into the parsed representation;

where the transformation component receives the parsed representation from the first semantic analysis and generates a token stream from the parsed representation wherein the token stream comprises second language tokens of a second programming language and wherein a plurality of compilation phases of the first compiler are skipped;

where the second syntactic analysis phase of the second compiler receives the token stream from the transformation component and compiles the token stream into an object code, wherein a plurality of compilation phase of the second compiler are skipped;

wherein the transformation component provides the token stream to the second compiler in memory;

wherein the plurality of compilation phases of the first compiler that are skipped comprise the first optimization, the first code generation, and writing the object code as an output file; and wherein the plurality of compilation phases of the second compiler that are skipped comprise the second lexical analysis and accepting the object code as an input file.

2. The system according to claim 1, wherein: each of the first compiler and the second compiler is one of JSP, Java® source code, Java® class code, and Java® byte code compiler.

3. The system according to claim 1, wherein the first compiler performs at least the compilation phases of accepting the source file in the first programming language as an input file.

4. The system according to claim 1, wherein: the second compiler performs at least one of the following compilation phases: optimization; generating an object code in the second programming language; and writing the object code in the second programming language to the disk as an output file.

5. The system according to claim 1, wherein: the parsed representation processed by the transformation component is a parse tree.

6. The system according to claim 5, wherein: the order of nodes in the parse tree are adjusted before the parse tree is processed by the transformation component.

7. The system according to claim 5, wherein: the transformation component generates the token stream by traversing the parse tree via an in-order tree traversal.

8. A method implemented by a processor that executes instructions stored in memory, the method to provide programming language translation, comprising:

compiling a source file in a first programming language into a parsed representation by a first compiler, the first compiler transforming the source file into first language tokens, and parsing the first language tokens into the parsed representation;

receiving, by a transformation component, the parsed representation from a first semantic analysis, the transformation component generating a token stream from the parsed representation and providing the token stream to the second compiler in memory via a transformation component without accessing a disk, wherein a plurality of compilation phases of the first compiler are skipped, the token stream comprising second language tokens of the second programming language;

receiving, by a second syntactic analysis phase of the second compiler the token stream from the transformation component and compiling the token stream into an object code in a second programming language by the second compiler, wherein a plurality of compilation phases of the second compiler are skipped;

wherein the first compiler comprises a first lexical analysis, a first syntactic analysis, the first semantic analysis, a first optimization, and a first code generation;

wherein the second compiler comprises a second lexical analysis, a second syntactic analysis, the second semantic analysis, a second optimization, and second code generation;

wherein the plurality of compilation phases of the first compiler that are skipped comprise the first optimization, the first code generation, and writing the object code as an output file; and wherein the plurality of compilation phases of the second compiler that are skipped comprise the second lexical analysis and accepting the object code as an input file.

9. The method according to claim 8, wherein: each of the first compiler and the second compiler is one of JSP, Java® source code, Java® class code, and Java® byte code compiler.

10. The method according to claim 8, further comprising: performing at least the compilation phases by the first compiler of accepting the source file in the first programming language as an input.

11. The method according to claim 8, further comprising: performing at least one of the following compilation phases via the second compiler: optimization; generating an object code in the second programming language; and writing the object code in the second programming language to the disk as its output file.

12. The method according to claim 8, wherein: the parsed representation processed by the transformation component is a parse tree.

13. The method according to claim 12, further comprising: adjusting the order of nodes in the parse tree before the parse tree is processed by the transformation component.

14. The method according to claim 12, further comprising: generating the token stream by traversing the parse tree by an in-order tree traversal.

15. A machine storage medium having instructions stored thereon that when executed by a processor cause a system to:

compile a source file in a first programming language into a parsed representation by a first compiler, the first compiler transforming the source file into first language tokens, and parsing the first language tokens into the parsed representation;

receiving, by a transformation component, the parsed representation from a first semantic analysis, generate, by the transformation component, a token stream from the parsed representation produced by the first compiler and provide the token stream to the second compiler by the transformation component, wherein a plurality of compilation phases of the first compiler are skipped, wherein the token stream comprises second language tokens of the second programming language;

receiving, by a second syntactic analysis phase of the second compiler the token stream from the transformation component and compiling the token stream into an object code in a second programming language by the second compiler, wherein a plurality of compilation phases of the second compiler are skipped;

wherein the first compiler comprises a first lexical analysis, a first syntactic analysis, the first semantic analysis, a first optimization, and a first code generation;

wherein the second compiler comprises a second lexical analysis, a second syntactic analysis, the second semantic analysis, a second optimization, and a second code generation;

wherein the plurality of compilation phases of the first compiler that are skipped comprise the first optimization, the first code generation, and writing the object code as an output file; and wherein the plurality of compilation phases of the second compiler that are skipped comprise the second lexical analysis and accepting the object code as an input file.

16. The machine storage medium of claim 15, wherein: each of the first compiler and the second compiler is one of JSP, Java® source code, Java® class code, and Java® byte code compiler.

17. The machine storage medium of claim 15, further comprising instructions that when executed cause the system to: perform the following compilation phase via the first compiler: accepting the source file in the first programming language as its input file.

18. The machine storage medium of claim 15, further comprising instructions that when executed cause the system to:

perform at least one of the following compilation phases via the second compiler: optimization; generating an object code in the second programming language; and writing the object code in the second programming language to the disk as its output file.

19. The machine storage medium of claim 15, wherein: the parsed representation processed by the transformation component is a parse tree.

20. The machine readable storage of claim 19, further comprising instructions that when executed cause the system to:

adjust the order of nodes in the parse tree before the parse tree is processed by the transformation component.

21. The machine storage medium of claim 19, further comprising instructions that when executed cause the system to:

generate the token stream by traversing the parse tree via an in-order tree traversal.

22. A system that includes a means for executing instructions that provide programming language translation, comprising:

means for compiling a source file in a first programming language into a parsed representation before generating an output source file in a second programming language, the first compiler transforming the source file into first language tokens, and parsing the first language tokens into the parsed representation;

means for receiving the parsed representation from a first semantic analysis, means for generating the token stream from the parsed representation produced by the means for compiling the source file and providing the token stream to the means for compiling the token stream to the means for compiling the token stream without utilizing a source file in the second programming language, wherein a plurality of compilation phases of the means for compiling the source file are skipped the token stream comprising second language tokens of the second programming language means for receiving at a second syntactic analysis phase of the means for compiling the token stream the token stream from the means for generating the token stream and compile the token stream into an object code in a second programming language, wherein a plurality of compilation phases of the means for compiling the token stream are skipped;

wherein the means for compiling the source file comprises a first lexical analysis, a first syntactic analysis, a first semantic analysis, a first optimization, and a first code generation;

wherein the means for compiling the token stream comprises a second lexical analysis, a second syntactic analysis, the second semantic analysis, a second optimization, and a second code generation;

wherein the plurality of compilation phases of the means for compiling the source file that are skipped comprise the first code generation, and writing the object code as an output file; and wherein the plurality of compilation phases of the means for compiling the token stream that are skipped comprise the second lexical analysis and accepting the object code as an input file.

* * * * *